Jan. 10, 1956 F. B. BURT 2,730,221
CLUTCH AND SPINDLE DISENGAGING MEANS FOR TURNTABLES
Filed Sept. 29, 1949 3 Sheets-Sheet 1

INVENTOR.
FARLOW B. BURT
BY
Cecil F Arena
ATTORNEY

INVENTOR.
FARLOW B. BURT

United States Patent Office 2,730,221
Patented Jan. 10, 1956

2,730,221

CLUTCH AND SPINDLE DISENGAGING MEANS FOR TURNTABLES

Farlow B. Burt, South Bend, Ind., assignor to Bendix Aviation Corporation, South Bend, Ind., a corporation of Delaware Application September 29, 1949, Serial No. 118,553

6 Claims. (Cl. 192—117)

This invention relates to phonograph apparatus.

It is an important object of the invention to provide a novel turntable drive for use with a phonograph apparatus.

Another important object of the invention resides in the provision of a turntable drive mechanism for a phonograph apparatus wherein the turntable is driven through a central shaft.

The above and other objects and features of the invention will be apparent from the following description of the apparatus taken in connection with the accompanying drawings which form a part of this specification, and in which.

Figure 3:
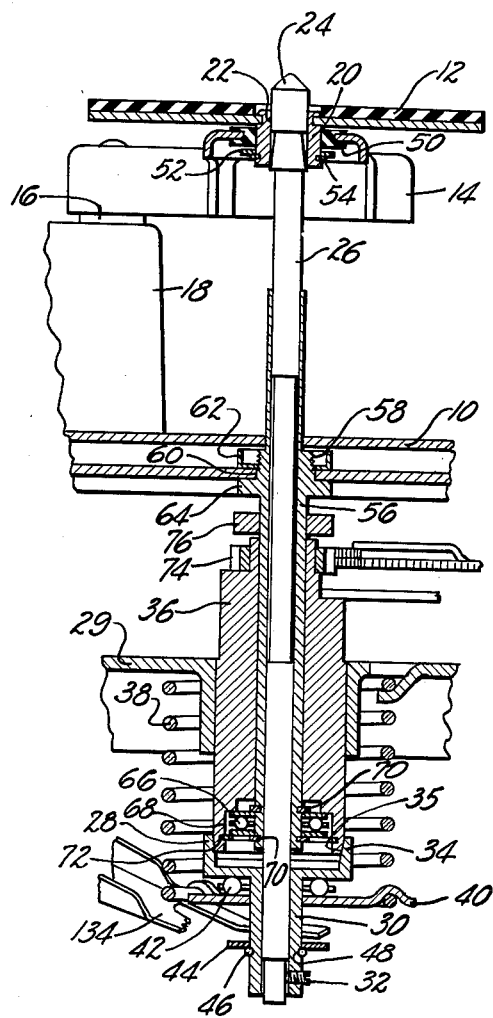
Figure 3 is an enlarged view of Figure 1 showing the turntable drive.

Referring now to Figure 3 of the drawings the reference numeral 10 designates a platform from which a turntable 12 is supported for rotation. The turntable is rotatably carried at one end of an arm 14 the other end of which is supported on a shaft 16 suitably mounted for rotation in a boss 18 integral with the upper side of the platform. The turntable is equipped with a driving connection in the form of a hub 20 having a tapered hole 22. This tapered hole 22 receives a tapered end or collet 24 of a member or shaft 26 arranged to be moved into and out of engagement with said turntable. In this way the tapered hole 22 and tapered end 24 act together as a friction clutch or coupling to transmit torque from the shaft 26 to the turntable 12. A clutch 28 is located at the lower end of the shaft 26 and is interposed between the shaft and drive wheel 29. One part 30, of the clutch, is securely fastened to the shaft by a set screw 32. The part 30, of the clutch, is constructed with an expanded flange portion 34 which engages a chamfered end 35 of the drive wheel hub 36. A coil spring 38, has one end carried by the drive wheel, and its other end attached to a retainer plate 40 to thereby put the spring under tension, thus drawing the part 30 of the clutch into engagement with the chamfered end 34 of the hub. A ball bearing assembly 42 is interposed between the retainer plate 40 and the expanded flange portion 34 to provide a relatively frictionless connection through the spring 38 to the clutch, thus permitting the spring and retainer plate 40 to rotate freely with the drive wheel when the clutch is disengaged from the hub and not rotating the shaft 26. The lower end of the clutch is equipped with a washer 44 retained in position by a clip 46 carried in a groove 48. The function of the washer 44 will be described hereinafter.

The coil spring 38 urges the tapered end 24 of the shaft 26 into engagement with the turntable when the clutch 28 is engaged with the drive wheel hub 36. However, when the shaft 26 is withdrawn from the turntable the turntable is allowed to rest on one end of the arm 14. The turntable hub 20 fits inside a grommet 50 located at said one end of the arm. The grommet prevents metallic contact between the turntable and arm 14 during cycling operations to eliminate objectionable noise. The turntable is raised vertically off the grommet when the end 24, of the shaft 26, is engaged with the turntable. Thus, the entire weight of the turntable when raised off grommet 50 is carried by shaft 26. This weight is great enough to produce a sufficient frictional engagement between the turntable and shaft to transmit the required torque to the turntable without slippage. A washer 52, which encircles the lower end of the turntable hub 20, and is retained in position by a retainer ring 54, engages the grommet 50, when the turntable is raised vertically beyond a predetermined height, thus precluding the removal of the turntable from the arm 14.

A tubular support 56 extends from the underside of the platform for rotatably supporting the drive wheel 29 in the hub 36. The tubular support is provided with an enlarged threaded section 58, extending through an opening 60 in the platform, for threadedly receiving a locknut 62, which, when tightened will draw an expanded annular portion 64, integral with the support 56, against the bottom side of the platform so as to retain said support in rigid relationship to the platform. A bearing assembly 66 is carried by the lower end of the tubular support 56. The lower end of the hub 36 is counterbored at 68 to receive the bearing assembly 66, which is held in position on the hub by snap rings 70. A retaining ring 72 is fitted into a groove in the counterbore so that a portion of the ring engages the bearing assembly 66 to prevent moving the drive wheel hub 30 vertically along the tubular support. A pinion gear 74 is keyed to the upper end of the hub 36 for a purpose to be hereinafter described. A felt washer 76 encircles the tubular support just above the upper end of the hub. The felt washer is saturated with oil which feeds down the exterior of the tubular support to thereby lubricate the interior of the hub which is in radial contact with the support.

Figure 1:
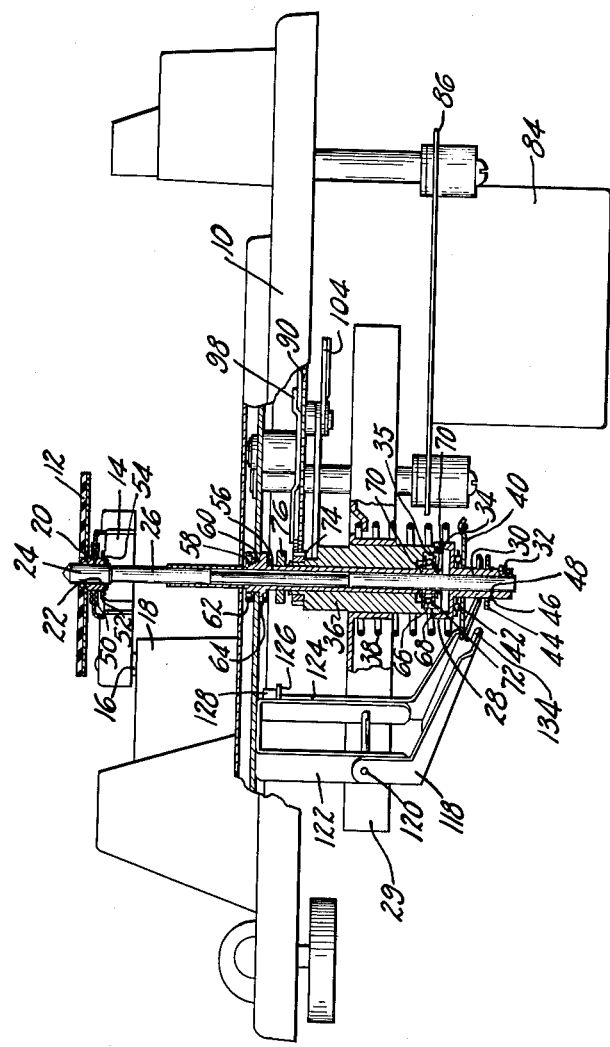
Figure 1 is a side elevational view of a phonograph apparatus with the turntable drive in vertical section to more clearly illustrate the invention.
Figure 2:
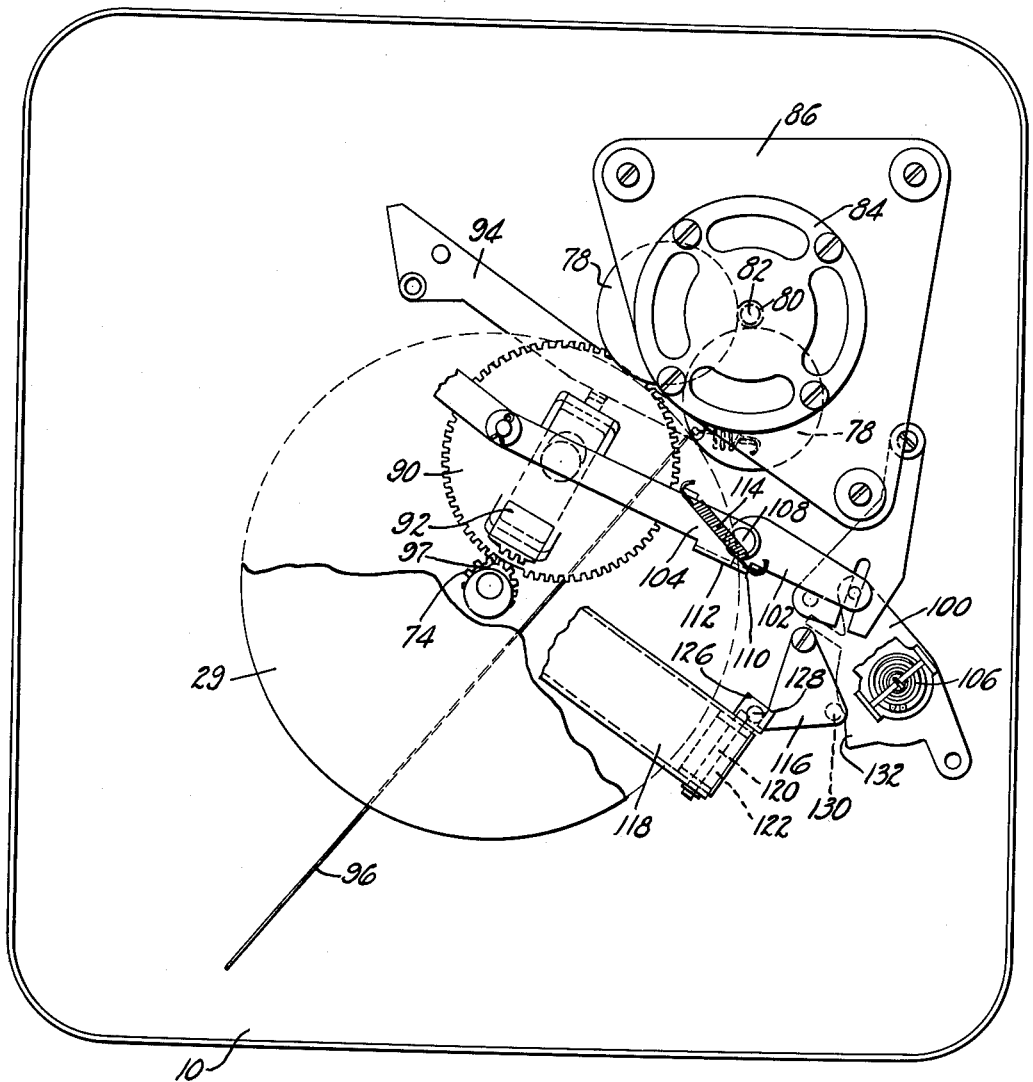
Figure 2 is a bottom plan view of the apparatus of Figure 1 intended to show the driving mechanism for the turntable.

Referring to Figures 1 and 2, a pair of wheels 78 are interposed between the periphery of the drive wheel 29 and a pulley or sleeve 80 secured to a shaft 82, of a motor 84 mounted on a plate 86 carried beneath the platform. The drive wheel is thus connected to the single phase capacitance motor for clockwise or counterclockwise rotation. With reference to Figure 2 clockwise rotation of the pulley 80 will tend to wedge the wheel 78 on the left between the pulley and the drive wheel 29, thus imparting a clockwise driving force to the wheel. At this time the wheel 78 on the right will tend to swing out from the drive wheel. To drive the drive wheel in a counterclockwise direction the pulley 80 is rotated counterclockwise thus causing the wheel 78 on the right to wedge between the pulley and the drive wheel thereby imparting a driving force to the latter wheel. This action of the drive wheel 29 rotates the pinion gear 74 clockwise or counterclockwise.

For controlling the clutch 28, interposed between the shaft 26 and the drive wheel, the pinion 74 is caused to intermesh with an interrupted gear 90, rotatably secured to the under side of the platform. A gear sector 92 is slidably positioned on the interrupted gear for engagement with the pinion. A reject lever 94 is pivotally fastened on the underside of the platform with one end arranged for engagement with the gear sector 92. A rod 96 has one end connected to the reject lever with the other end of the rod terminating at the upper side of the platform where it will be accessible to the operator of the machine, for initiating a cycle of operation. During a noncycling period the interrupted gear is positioned so that the mutilated portion 97 thereof is in registry with the pinion gear. At this time the gear sector is withdrawn from engagement with the pinion gear under the influence of a U-shaped spring 98, which has one end fixed to the interrupted gear, and its other end, or free end, in driving engagement with the gear sector.

A compound linkage interconnects the interrupted gear with the clutch control mechanism and comprises an actuator plate 100, linked to a jack-knife connection, having levers 102 and 104. The actuator plate is pivotally carried on a hub or boss 106 integral with the underside of the platform. The adjacent ends of the levers 102 and 104 are pivotally joined together by a rivet 108. The adjacent ends of these two levers are formed with mutually engageable portions 110 and 112 respectively, so that this jack-knife connection is rigid at times and collapsed at other times. A coiled spring 114 has its ends connected to the contiguous ends of the levers 102 and 104 so that the centerline or axis of the spring is below the center of pivot of the levers to thereby rotate the levers in opposite directions around the rivet 108 as a center and bring the mutually engageable portions 110 and 112 together. Obviously if either lever 102 or 104 were rotated about the rivet 108 so that the axis of the spring were above the center of the rivet, the jack-knife connection would collapse. Since the jack-knife connection performs a function required only in the general operation of the device and forms no part of the present invention a further description thereof and of its action is believed unnecessary. The end of lever 104 opposite the jack-knife connection is pivotally secured to the interrupted gear 90 at a point off its center of rotation so as to impart a reciprocating motion to the lever 104 when the gear is revolved.

A force transmitting member 116 is interposed between the actuator plate 100 and a crank arm 118, pivotally carried by a pin 120 supported in a bracket 122 fastened to the underside of the platform. The crank arm 118 is furnished with an upwardly extending element 124 bent over to form a tab 126 for mounting a lug 128, against which one edge of the force transmitting arm 116 rides. The opposite edge of the arm 116 carries a cylindrically shaped boss 130, against which a cam 132, integral with the actuator plate 100, rides. The crank arm is equipped with a bifurcated end 134 which engages the clutch 28. This bifurcated end rests on the washer 44 carried on the clutch part 30. Rotation of the actuator plate 100 pivots the crank arm about its fulcrum pin 120 to thereby cause the clutch part 30 to become disengaged from the chamfered end 34 and simultaneously withdraw the shaft 26 from engagement with turntable 12. The above action of the crank arm is against the spring 38 which now returns the shaft 26 to engagement with the turntable and re-engages the clutch part 30 with the chamfered end 35, when the actuator plate is rotated back to the initial position.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. In a phonograph apparatus, in combination, a platform, a turntable carried above said platform, a mechanism for driving said turntable, said mechanism including a rotatable wheel provided with a hub, a tubular support for said hub, said tubular support carried by said platform, a member constructed and arranged for drivably engaging said turntable and extending through said tubular support above and below said platform, said turntable being provided with an opening for drivably receiving that portion of said member which extends above said platform, and a two part clutch interposed between said member and said rotatable wheel, one part of said clutch being carried by that portion of said member which extends below said platform and the other part being formed in said hub.

2. In a phonograph apparatus, in combination, a turntable, a mechanism for driving the turntable and including a continuously rotating wheel provided with a hub, a shaft member supported in the hub and having end portions extending above and below the hub, one end of said member being formed to frictionally engage said turntable for driving the same, a clutch interposed between the other end of said member and the hub, said clutch having two relatively movable parts, one of which is integral with said hub, the other of which is drivably related with said other end of the member, means urging said clutch parts into engagement, and means for disengaging said clutch parts.

3. In a phonograph apparatus, in combination, a turntable for supporting a record during the reproduction thereof, said turntable having a tapered receptacle centrally located therein, a mechanism for driving the turntable, said mechanism including a shaft having one end formed for drivably engaging said turntable, a motor-driven member, a clutch interposed between said member and said shaft, said shaft having a tapered end receivable in said tapered receptacle in the turntable such that engagement of the clutch establishes the shaft in a position of driving engagement with the turntable and disengagement of the clutch establishes the shaft in a position out of driving engagement with the turntable, and clutch control means actuable at a predetermined time during a cycle of operation of said apparatus.

4. In a phonograph apparatus, the combination of a turntable and a mechanism for driving the turntable, said mechanism comprising a member supported for engagement with and disengagement from said turntable, a continuously rotating wheel, a clutch interposed between said wheel and said member, said clutch having two relatively movable parts, one of which is associated with said wheel, the other of which is drivably related with said member, and means connected to said clutch for disengaging said clutch parts thereby disengaging said member from said turntable.

5. In combination with a phonograph apparatus of the type which plays each successive record of a stack of records in a cycle of operation, a turntable equipped with a central opening therein, a mechanism for driving the turntable, said mechanism including a member formed for driving engagement with said central opening, means for rotating said member, clutch means interposed between said rotating means and said member, and means automatically actuable at a predetermined time during a cycle of operation of said apparatus for disengaging said member from said central opening, said latter-mentioned means also serving to disengage said clutch at said predetermined time.

6. In a phonograph apparatus, in combination, a turntable, a rotary shaft member arranged to drive said turntable, said member having one end formed for engagement with and disengagement from said turntable, a continuously rotating wheel provided with a hub, a clutch interposed between said hub and the other end of said member, said clutch having two relatively movable parts, one of which is integral with said hub, the other of which is drivably related with said other end of the member, and means connected to said clutch for disengaging said clutch parts thereby disengaging said member from said turntable.

References Cited in the file of this patent

UNITED STATES PATENTS

| | | |
|---|---|---|
| Re. 22,551 | Andrews | Oct. 3, 1944 |
| 999,097 | Couade | July 25, 1911 |

(Other references on following page)

UNITED STATES PATENTS

| | | |
|---|---|---|
| 1,145,793 | Preuss | July 6, 1915 |
| 1,255,143 | Ebeling | Feb. 5, 1918 |
| 1,523,173 | Clark | Jan. 13, 1925 |
| 1,595,141 | Cortella | Aug. 10, 1926 |
| 1,942,158 | Winchell | Jan. 2, 1934 |
| 1,952,359 | Bosco | Mar. 27, 1934 |
| 2,072,924 | Smyth, Jr. | Mar. 9, 1937 |
| 2,281,548 | Andrews | May 5, 1942 |
| 2,506,926 | Johnson | May 9, 1950 |
| 2,512,724 | Like | June 27, 1950 |
| 2,598,584 | Miller et al. | May 27, 1952 |
| 2,634,134 | Dietz | Apr. 7, 1953 |

FOREIGN PATENTS

| | | |
|---|---|---|
| 5,129 | Great Britain | Sept. 17, 1908 |